Kirwan Y. Messick, Inventor

Inventor
Kirwan Y. Messick,
By Shepherd N Campbell
Attorneys

Patented May 5, 1936

2,039,489

UNITED STATES PATENT OFFICE 2,039,489

TRANSPORTATION UNIT

Kirwan Y. Messick, Clarendon, Va.

Application March 15, 1933, Serial No. 660,941

17 Claims. (Cl. 105—215)

This invention relates to transportation units of the type adapted to travel either upon the rails of a railroad track or upon an ordinary roadway.

The railroads find it increasingly difficult to compete with motor trucks because it is much more economical to load freight once upon a truck, as for example, at a manufacturing plant, and deliver the same directly to the door of the ultimate consumer, or the jobber, or retail merchant, as the case may be, instead of having to haul the freight from such manufacturing plant to a railroad station, there unload, load it again upon a freight car, unload it again at a railroad station, load it again upon a truck, and finally unload it again at the point of delivery.

It has been proposed to solve the difficulties with which the railroads find themselves confronted by the development of transportation units in the form of trucks, trailers, or the like, having two sets of wheels; one set being adapted to travel upon rails and the other, a pneumatic tire set, being adapted to travel upon a roadway, together with means for bringing either of these sets of wheels into action. The net result of such an arrangement is to render it possible to load freight at a point of origin, transport it over ordinary roadways to a railroad track, transport it upon said railroad track long distances, and transport it again over ordinary roadway or city streets from the railroad track to point of final delivery.

The present invention is particularly designed to provide a unit of this character having certain marked advantages over any devices of this character, heretofore proposed, in the following particulars.

*First.*—Means are provided for shifting the ground or track wheels into operative position in such manner that after such shifting has been effected the operating means for effecting shifting is relieved of all strain and the wheels in use are supported in a highly safe and effective way.

*Second.*—The wheels in use are capable of full spring action in a manner common in motor trucks.

*Third.*—That portion of the structure which is thrown out of action, for example, the track wheel end of the structure, is rigidly supported and constitutes a fulcrum from which the spring mechanism of the wheels in use (in that case the ground wheels) may act.

*Fourth.*—A common driving means is provided for the ground and track wheels operable throughout the adjustment of said wheels into and from operative position so that it is possible to operate said ground and track wheels from a common drive shaft and through a common differential mechanism.

*Fifth.*—Means are provided for connecting a plurality of vehicles provided with my improved mechanism, end to end in the form of a train so that a number of these trailer-like bodies may be carried in train form upon a railroad track, and, at destination be readily connected to a conventional tractor-like power unit for conduct to final point of destination.

In its preferred form, the invention comprises a pivoted truck-like element carrying ground wheels at its forward end and track wheels at its rear end together with a very powerful and positive wedging mechanism acting upon cam ways of the track for rocking it in one direction or the other and holding it positively in such rocked position, without strain upon the operating members of the wedging mechanism.

In the accompanying drawings—

Like numerals designate corresponding parts in all the figures of the drawings.

Figure 1:
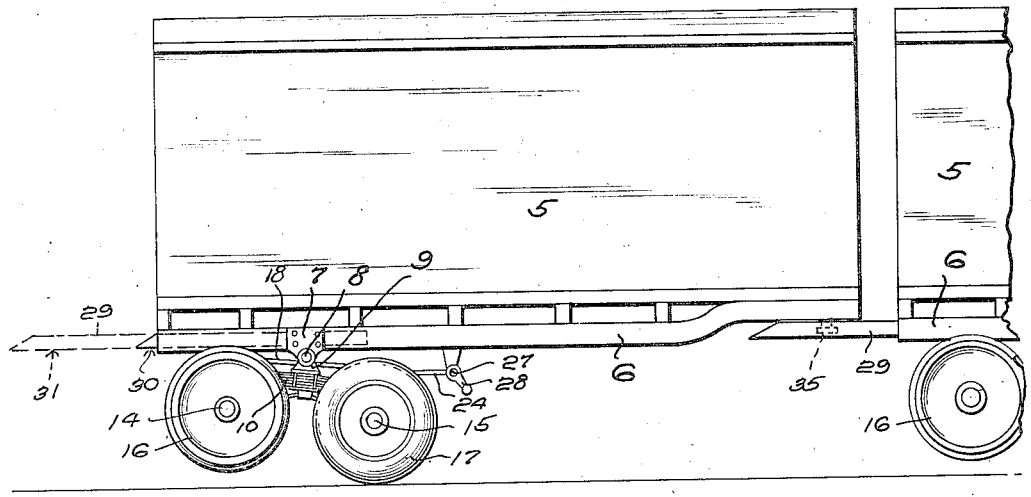
Figure 1 is a side elevation illustrating a transportation unit constructed in accordance with the invention and connected in train formation to a corresponding unit.

Referring now to Figure 1 of the drawings, 5 designates the body and 6 the chassis or side frame members of the transportation unit. Brackets 7 carried by these side frame members support transverse shaft 8, and this shaft in turn carries hangers 9 of springs 10. The ends of the springs 10 support axle housings 12 through shackles 13, and these axle housings carry axles 14 and 15 which support track wheels 16 and ground wheels 17, respectively.

Figure 2:
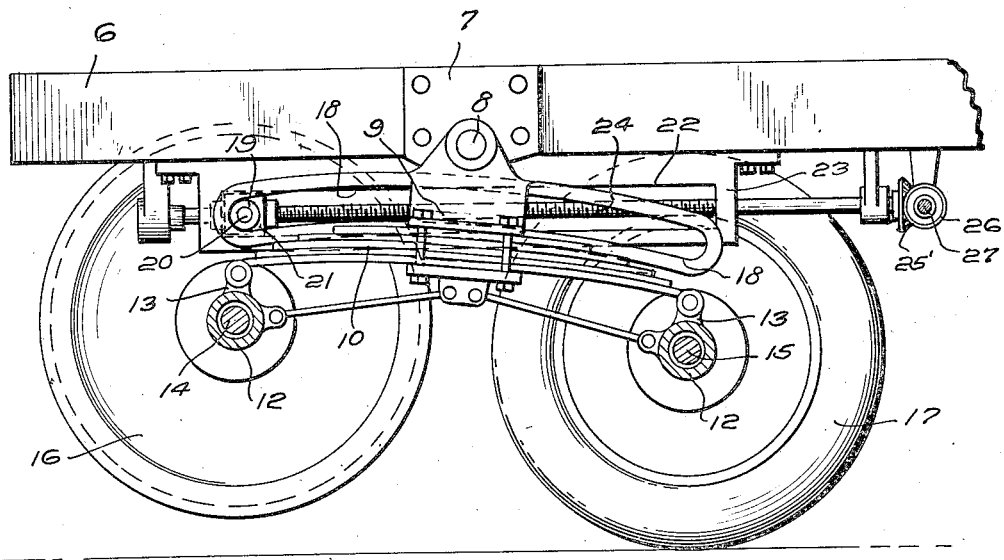
Figure 2 is an enlarged view of the rocking truck mechanism of Figure 1.

It will be understood that the structure of Figure 2 is duplicated upon each side of the vehicle, and consequently a description of one will serve as a description of both. Cam ways 18 rigidly affixed to the hangers 9 receive rollers, or other equivalent cam elements 19 upon a transverse shaft 20, and this shaft is in turn supported and guided at its ends by guide blocks 21 which travel in ways 22 of a fixed frame member 23. Bodily endwise travel is imparted to the shaft 20 and rollers 19 by a screw 24, said screw acting upon a nut 25 that is carried by said shaft 20.

Thus, it will be seen that as endwise movement is imparted to the rollers 19, the truck comprising the axles, wheels, springs, cam ways 18 and hangers 9 will be rocked in one direction or the other to lower the track wheels and raise the ground wheels, or vice versa. Any desired means may be employed for imparting rotation to the screw 24, one such means comprising bevelled pinion 25' and 26, transverse shaft 27 and hand crank 28.

An important feature of the present invention is that after the screw 24 has performed its function of shifting, the nut and rollers, said screw is relieved of all strain. In fact the hand crank may be released and it will not even move in a reverse direction under the strain imposed thereon. Therefore, these operating members are free of all strain during transit of the vehicle, and the wheels which are in use are held very positively in use and there is no possibility of accidents being caused by the wheels tending to change their adjusted positions during transit.

The ends of the springs which carry the wheels in use are free to flex in their normal way.

The side frame members 6 of motor trucks, as commonly manufactured, are of channel formation with their open sides disposed inwardly. I take advantage of this fact to mount in said channels sliding frame members 29, which frame members may be held either in retracted position, illustrated at 30, or in the extended position, illustrated at 31, by means of pins 32 entering suitable openings 33 (only one of which is shown) in said sliding frame members. These sliding frame members 29 are provided with the tapering throats 34 for the reception of the king pins 35 of the trailer units next in the rear. When these king pins ride into the throats 34 they contact with the extensions 36 of latches 37 and throw said latches around to bring the noses 38 of said latches into locking engagement with said king pins.

This particular construction is not a part of my invention and is in common use in connecting motor units to trailer units. It is in the provision of the sliding frame which may be pushed inwardly to be out of the way when the trailer is travelling on city streets, or may be drawn out, as illustrated at 29, to connect a group of these transportation units into a train, that this portion of my invention particularly resides.

Figure 3:
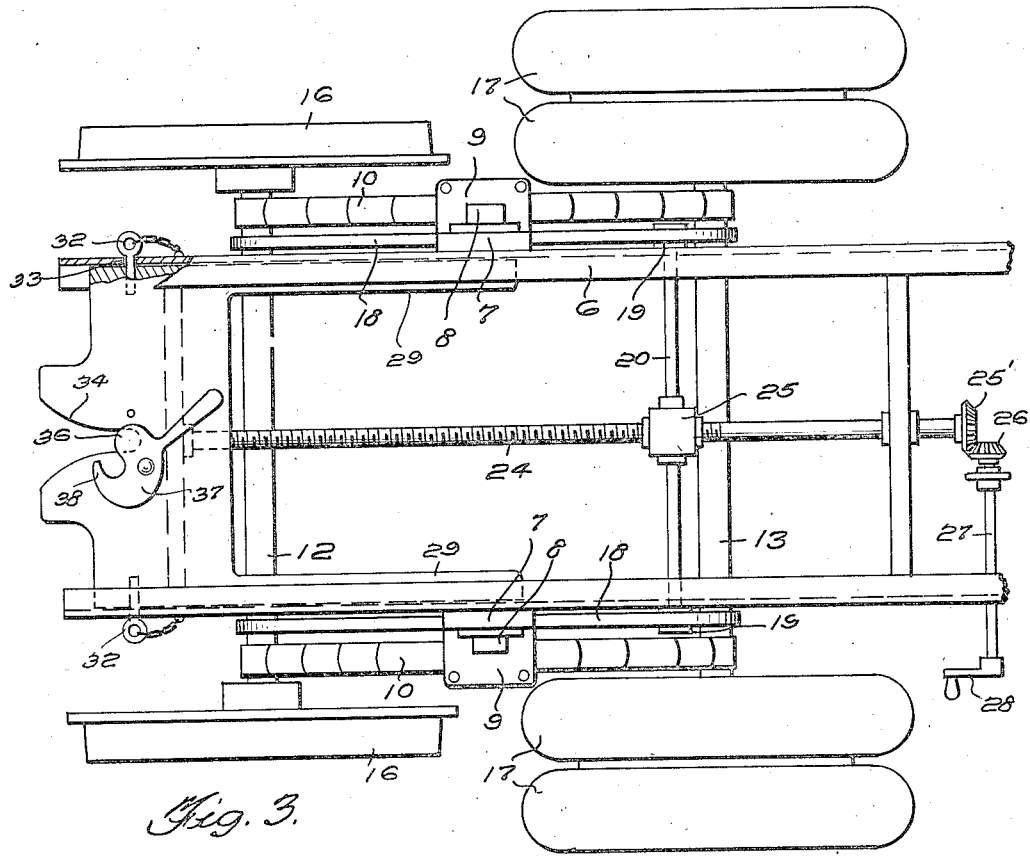
Figure 3 is a plan view of the chassis of the mechanism of Figure 1.
Figure 4:
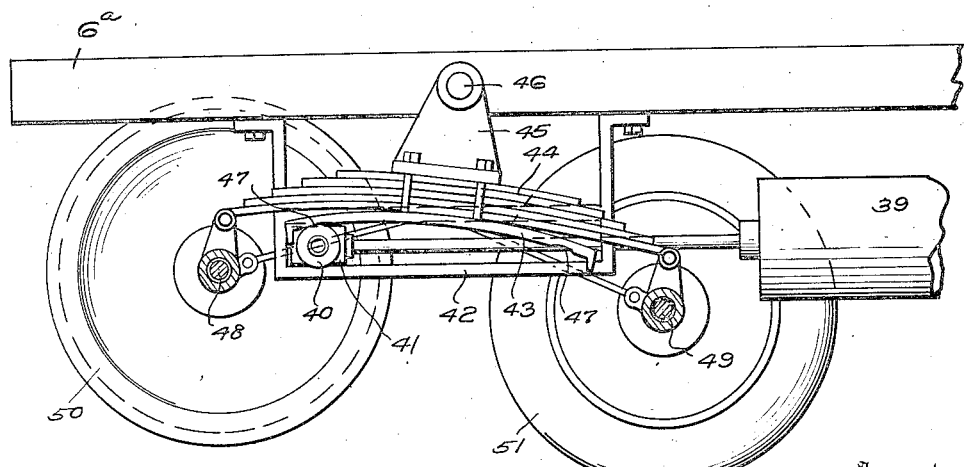
Figure 4 is a side elevation illustrating a modified form of the invention.

In the modification of the invention illustrated in Fig. 4 the same principles are employed except that in this case, the power unit for shifting the truck comprises a pneumatic or hydraulic cylinder 39. However, it is apparent that the particular means for shifting the roller 49 is not of the essence of the invention because this roller could be just as effectively shifted by the mechanism of Figure 3. However, the rollers 40 are shifted (it being understood that this structure is duplicated upon the opposite side of the truck as previously described and that said rollers are guided by blocks 41 travelling in ways 42), said rollers act upon cams 43 that are secured to the springs 44, said springs in turn being supported from hangers 45 that are pivoted, at 46, upon the chassis 6a.

The cams 43 have indented portions 47 into which the rollers ride at the opposite ends of travel of said rollers. Axles 48 and 49 support track and ground wheels 50 and 51, respectively, as in the figures previously described. It is clear that the travel of the rollers 40 will result in moving either the track or the ground wheels into operative position and that when the rollers are in a position illustrated in Figure 4, those portions of the springs which support the wheels 51 are free to flex in their normal way; that all endwise strain upon the operating mechanism of the rollers 40 is relieved, and that said rollers constitute a positive abutment for supporting those ends of the spring that are not in use.

Figure 5:
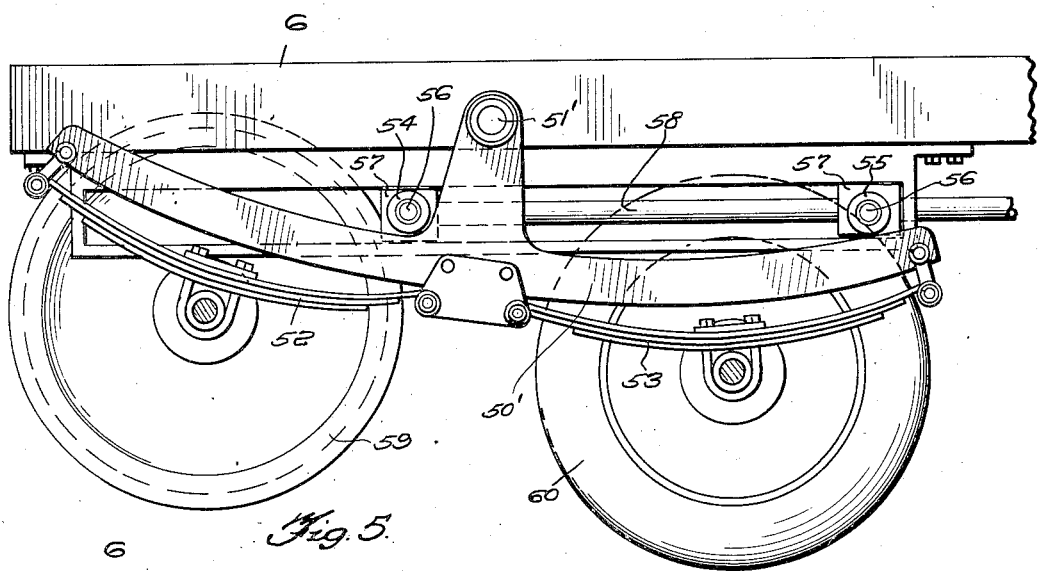
Figure 5 is a side elevation illustrating a further modification of the invention.

In the form of the invention illustrated in Figure 5 arcuate truck frame members 50' swinging from the pivot 51' carry the springs 52 and 53, said truck frame members being shifted upon pivot 51 by the action of cam rollers 54 and 55. These cam rollers are carried by shafts 56, and these shafts 56 in turn are carried by guide blocks 57 that are actuated by a screw 58 through a nut, not shown, but corresponding to the nut 25 in Figure 3. In this form of the invention the track and ground wheels 59 and 60, respectively, have independent springs but are shifted in unison through the mechanism described.

Figure 6:
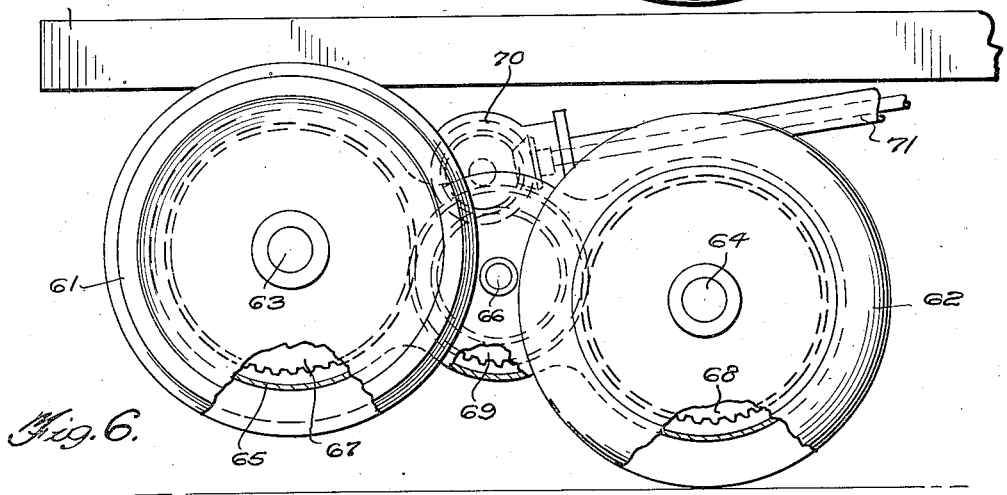
Figure 6 is a side view illustrating a common driving mechanism which may be employed in the case of driven instead of mere trailer units and Figure 7 is a fragmentary plan view of the structure of Figure 6.
Figure 7:
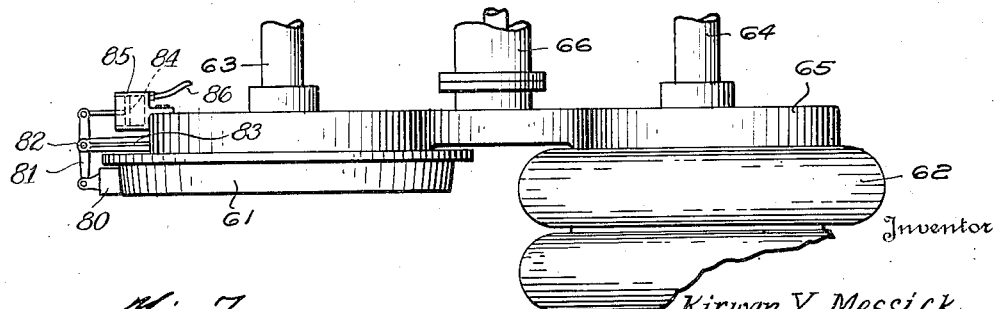

In the form of the invention illustrated in Figures 6 and 7, the track wheels 61 and ground wheels 62 are carried by axles 63 and 64 which are journaled in housings 65 (only one of which is shown). These housings are in turn supported upon a central shaft 66, said shaft constituting the pivot about which the wheels 61 and 62 are moved in their bodily tipping movement. This is the form of the invention in which these wheels are positively driven throughout all their positions of adjustment.

In this case the shafts 63 and 64 carry the gear wheels 67 and 68 which mesh with gear wheel 69. 70 indicates the housing of a conventional type of differential mechanism and 71 indicates a conventional main drive shaft leading to said differential housing; it being understood that the gear wheel 69 constitutes a driven part of the differential mechanism of conventional form. By disposing the differential mechanism upon the shaft 66 which constitutes the pivot for wheels 61 and 62 in their bodily movement, I am able to maintain driving connection to these wheels throughout all positions of adjustment of the same. It is true that under this arrangement the idle wheels rotate as well as the wheels that are in use, but this is by no means objectionable since there is no load upon these wheels, and consequently, the wear upon them with usual roller bearings, is negligible.

It will be observed that the outermost wheels, and by that I mean the wheels nearest the rear end of the trailer of Fig. 1, for example, are the track wheels, while the innermost wheels are the ground wheels. There is an important reason for this in that this arrangement gives a shorter turning radius when the ground wheels are in use, and these wheels are usually in use on city streets and at the time of actual delivery of the freight when turning in restricted spaces is frequently necessary.

It is common practice in various types of motor vehicles to apply brake mechanism at various points between the engine and the driven wheels, and it is merely within the skill of usual engineering practice to do this. Suitable brake mechanism may be applied to the shaft of gear wheel 69, or the railroad track wheels may have conventional forms of railroad brake shoes applied thereto in which case said brake shoes would act to brake the mechanism with either the ground or track wheels in use. One brake arrangement which may be employed is illustrated in Fig. 7 where a brake shoe 80 is carried by a lever 81 that is pivoted at 82 to a bracket 83 of housing 65. This lever 81 is actuated by piston 84 of air cylinder 85 the latter being supplied with air under pressure through a flexible hose 86.

Further, while I have illustrated the track and ground wheels as being driven in unison, it is apparent that the interposition of suitable clutches to permit either of these sets of wheels to be thrown out of action would constitute ordinary engineering practice.

I have illustrated several different forms of the invention in order to emphasize the fact that many ways will readily suggest themselves to the skilled engineer for accomplishing the objects sought. Consequently, I wish it to be understood that my invention is not limited to any particular way of accomplishing the objects sought, but that it includes within its purview whatever changes fairly come within either the terms or the spirit of the appended claims.

Having described my invention, what I claim is:

1. In combination with a vehicle body, of a truck-like frame mounted for rocking movement with respect to said body, ground wheels at one end of said frame, track wheels at the other end of said frame, a cam trackway carried by said frame, and cam means movable with respect to the body and acting upon the cam trackway for rocking the frame to move either the ground or the track wheels into engagement with a corresponding road bed.

2. A structure as recited in claim 1 in combination with springs constituting part of the truck frame and supporting the ground wheels with respect thereto.

3. The combination with a vehicle body, of a frame pivoted to rock with respect thereto and comprising a spring structure, ground and track wheels supported from said spring structure, a cam trackway, rollers or wedges engaging said trackway, and means for moving said rollers or wedges in a fixed line and substantially parallel to the vehicle body and longitudinally of the trackway to rock the frame and lower the ground wheels and elevate the track wheels, or vice versa.

4. A structure as recited in claim 3 wherein the means for moving the rollers longitudinally of the trackway comprise a screw, a nut, and a shaft by which the nut is carried and upon which the rollers are mounted.

5. A structure as recited in claim 3 wherein the means for moving the said rollers or wedges comprise a screw, means for turning said screw, a nut upon the screw, a transverse shaft by which the nut is carried, and guide means for said shaft, said rollers being supported outwardly of and movable with the said guide means.

6. In a structure of the character described, the combination with a rocking truck-like structure, of ground wheels and track wheels carried thereby, a driving element, and connections between the same and the ground and track wheels for driving the ground and track wheels from said driving element, said driving element being mounted concentrically with the pivot point about which said truck rocks, and means for driving said driving element.

7. A structure as recited in claim 6 wherein the driving means for said driving element comprises a differential mechanism.

8. In a device of the character described, the combination with a vehicle body, of an arcuate member pivoted thereto, a pair of springs hung from the under side of said arcuate member, ground and track wheels carried, respectively, by said springs, longitudinally movable rollers acting upon the arcuate face of said arcuate member and constituting cams, and guide means for causing said rollers to travel in a straight line, the longitudinal movement of said rollers acting upon said arcuate member to rock it upon its pivot to bring either the ground or the track wheels to operative position.

9. A device of the character described comprising a vehicle frame, a rocking truck-like member pivotally mounted with respect thereto and comprising a multiple leaf spring, a cam member upon the under side of said spring, a substantially straight guide way, a roller guide in said guideway and acting upon the under face of said cam member, means for shifting said member along the trackway and ground and track wheels supported from the opposite ends of said spring, the action of the roller upon the cam member serving to rock the truck-like member to move either the ground or the track wheels into operative position.

10. The combination with a vehicle body, a wheel carrying element pivoted to rock about a substantially horizontal axis with respect to said body, wheels carried thereby, a cam trackway upon said element, a wedging element acting upon said cam trackway to bring about movement of the said element about its axis, and means for imparting a powerful endwise thrust to said wedging element to rock the wheel carrying element about its pivot and raise or lower the said wheels.

11. A structure as recited in claim 10 wherein said wedging element is in the form of a roller.

12. A structure as recited in claim 10 wherein the wedging element is in the form of a roller and wherein said cam trackway is an arcuate one.

13. The combination with a vehicle body, a wedging element movable longitudinally thereof, means for imparting endwise thrust to the wedging element, guide means for said wedging element, a tiltable wheel carrying member, and a cam trackway upon said member with which said wedging element engages to tilt the wheel carrying member, and supporting wheels for the vehicle body journaled upon said tiltable member, the tilting of the wheel carrying member serving to raise or lower the supporting wheels.

14. The combination with a vehicle body, of a wheel-carrying frame pivoted to rock about a substantially horizontal axis with respect to the body, wheels carried by said frame, a straight line trackway, a sliding cam and wedge guided by said trackway and a cam surface upon the pivoted frame upon which the cam and wedge acts to rock the wheel carrying frame about its axis to thereby raise or lower the wheels.

15. A structure as recited in claim 14 in combination with a screw for actuating the sliding cam and wedge.

16. The combination with a vehicle body, of a frame pivoted to rock with respect thereto and comprising a spring structure, load carrying wheels supported from said spring structure, a straight line trackway supported from the body, a sliding cam guided by said trackway, and a cam surface upon the frame upon which the said cam acts to thereby rock the frame and bring said wheels to operative position.

17. A structure as recited in claim 3 wherein the wheels at the inner end of the spring structure are ground wheels and the wheels at the outer end of the spring structure are track wheels.

KIRWAN Y. MESSICK.